United States Patent
Don et al.

(10) Patent No.: US 6,732,231 B1
(45) Date of Patent: May 4, 2004

(54) SYSTEM AND METHOD FOR MANAGEMENT OF MIRRORED STORAGE DEVICES STORING DEVICE SERIAL NUMBERS

(75) Inventors: Arieh Don, Brookline, MA (US); Alexandr Veprinsky, Brookline, MA (US); Robert Mayer, Redwood City, CA (US)

(73) Assignee: EMC Corporation, Hopkinton, MA (US)

( * ) Notice: Subject to any disclaimer, the term of this patent is extended or adjusted under 35 U.S.C. 154(b) by 602 days.

(21) Appl. No.: 09/794,656

(22) Filed: Feb. 28, 2001

(51) Int. Cl.$^7$ .............................................. G06F 12/00
(52) U.S. Cl. ...................................... 711/114; 711/162
(58) Field of Search .............................. 711/114, 161, 711/162

(56) References Cited

U.S. PATENT DOCUMENTS

| | | | | |
|---|---|---|---|---|
| 5,751,936 A | * | 5/1998 | Larson et al. .................. 714/7 |
| 5,950,230 A | * | 9/1999 | Islam et al. .................. 711/156 |
| 6,167,531 A | * | 12/2000 | Sliwinski ...................... 714/13 |
| 6,226,711 B1 | * | 5/2001 | Fisher et al. ................. 711/111 |
| 6,282,619 B1 | * | 8/2001 | Islam et al. .................. 711/165 |
| 6,282,670 B1 | * | 8/2001 | Rezaul Islam et al. ......... 714/6 |

* cited by examiner

*Primary Examiner*—Kevin Verbrugge
(74) *Attorney, Agent, or Firm*—Robert Kevin Perkins; Leanne J. Fitzgerald; John M. Gunther

(57) ABSTRACT

This invention is configured to create and use a special data structure containing a data storage device's identification information for a storage device that will be duplicated. Upon such duplication, the special data is stored in a predetermined location on another device receiving the copied data and a flag bit is set to indicate whether or not the information in the data structure should be used to respond to a host inquiry regarding the identification of the storage device. Without reconfiguring the host's operating software, the system employs a method to respond to and satisfy a host inquiry for the storage device's identification information by employing the special data structure. This is done to avoid host conflict errors that might result from a conflict between identification information being replicated from the storage device and the other storage device to where its data is copied.

15 Claims, 10 Drawing Sheets

SYSTEM AND METHOD FOR MANAGEMENT OF MIRRORED STORAGE DEVICES STORING DEVICE SERIAL NUMBERS

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to management of multiple volumes of data distributed throughout a data storage environment, and more particularly to a system and method for management of device identifiers that are written as data and then may be physically distributed over more than one device.

BACKGROUND OF THE INVENTION

As is known in the art, computer systems generally include a central processing unit (CPU), a memory subsystem, and a data storage subsystem. According to a network or enterprise model of the computer system, the data storage system associated with or in addition to a local computer system, may include a large number of independent storage devices, typically disks housed in a single enclosure or cabinet. This array of storage devices is typically connected to several computers or host processors over a network or via dedicated cabling. Such a model allows for the centralization of data that is available to many users but creates a critical hub for operations.

Recently, disk redundancy has evolved as an alternative or complement to historical backups of the information stored on this critical hub. Generally speaking, in a redundant system having at least two storage devices, such as disk storage devices, data is copied and stored in more than one place. This allows the data to be recovered if one storage device becomes disabled. In a basic approach, a first disk storage device stores the data and a second disk storage device stores a mirror image of that data. Whenever a data transfer is made to the first disk storage device, the data is also transferred to the second disk storage device. Typically, separate controllers and paths interconnect the two disk storage devices to the remainder of the computer system.

While mirror copying has important advantages, it may lead to problems in certain circumstances when all of data including some that is unique to the physical storage device itself is replicated. For instance, a manufacturer of a storage device, such as a disk drive, usually identifies it with a unique number, known as a serial number. This serial number is integrated into the device itself, typically in a fashion so it can be communicated electronically. It is known that a typical host computer system may use those serial numbers for keeping track of storage devices and may write each device's serial number as data on the device itself. But when such data is replicated to another device, the serial number written as data will not match with the serial number integrated with the device that is receiving the replicated data. On the one hand there is the serial number integrated with the device and on the other hand there is the serial number previously written as data by a host. If the host is programmed to check for a match between these numbers then it will flag an error when they do not. In the situation where the data has been replicated from one device to another there will not be a match and the host will flag an error, possibly even prevent operation from continuing in certain circumstances.

What is needed is a way to prevent such errors occurring at a host interacting with a data storage system in which data is distributed over one or more disks but while still allowing mirror copying to occur.

SUMMARY OF THE INVENTION

The present invention is a system and method for management of device identification that is treated as device data, when such data is replicated from one storage device to at least one other storage device.

In one aspect of the invention, without reconfiguring the host's operating software, the system employs a method to respond to and satisfy a host inquiry for the storage device's identification information by selectively employing a special data structure. The invention is configured to create and store, in a first predetermined area, the special data structure containing a data storage device's identification information for a storage device that will be replicated. Upon such copying, the special data is stored in another predetermined location on the device receiving the copied data.

In a similar aspect of the invention, the data structure is placed in a predetermined area, e.g. as an area reserved for use by a customer engineer and restricted from access for user data, on the device which has its data copied (the source, primary or standard device). The data structure is copied to the same area on another device (remote, secondary or target), or other device. When the host, which is preferably an AS/400 from IBM, issues an inquiry to discover the serial number of the device to which the data has been copied, the serial number is read from the data structure rather than obtained in a conventional manner from the device itself. In this way the serial number obtained and presented to the host belongs to the device which had its data copied. By implementing the present invention, the serial number moves with the data to prevent the host flagging errors as described above.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

The methods and apparatus of the present invention are intended for use in data storage systems, such as the Symmetrix Integrated Cache Disk Array system available from EMC Corporation of Hopkinton, Mass. Specifically, this invention is directed to methods and apparatus for use in systems of this type that include transferring a mirrored set of data from a standard device to a redundant device for use in applications such as backup or error recovery, but which is not limited to such applications. The present invention addresses a problem that results when data is replicated from such a standard device and includes identification information for the standard device that may conflict with identification information for the device receiving the replicated data.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The logic for carrying out the method is embodied as part of the system described below beginning with reference to FIGS. 1 and 2, and which is useful for solving a particular problem created in the environments described with reference to FIGS. 3–9. One aspect of the invention is embodied as a method that is described below with detailed specificity in reference to FIGS. 12–14. For purposes of illustrating the present invention, the invention is described as embodied in a specific configuration and using special structures shown in FIGS. 10–11, but one skilled in the art will appreciate that the device is not limited to the specific configuration but rather only by the claims included with this specifications.

Data Storage Environment Including Logic for this Invention

Figure 1:
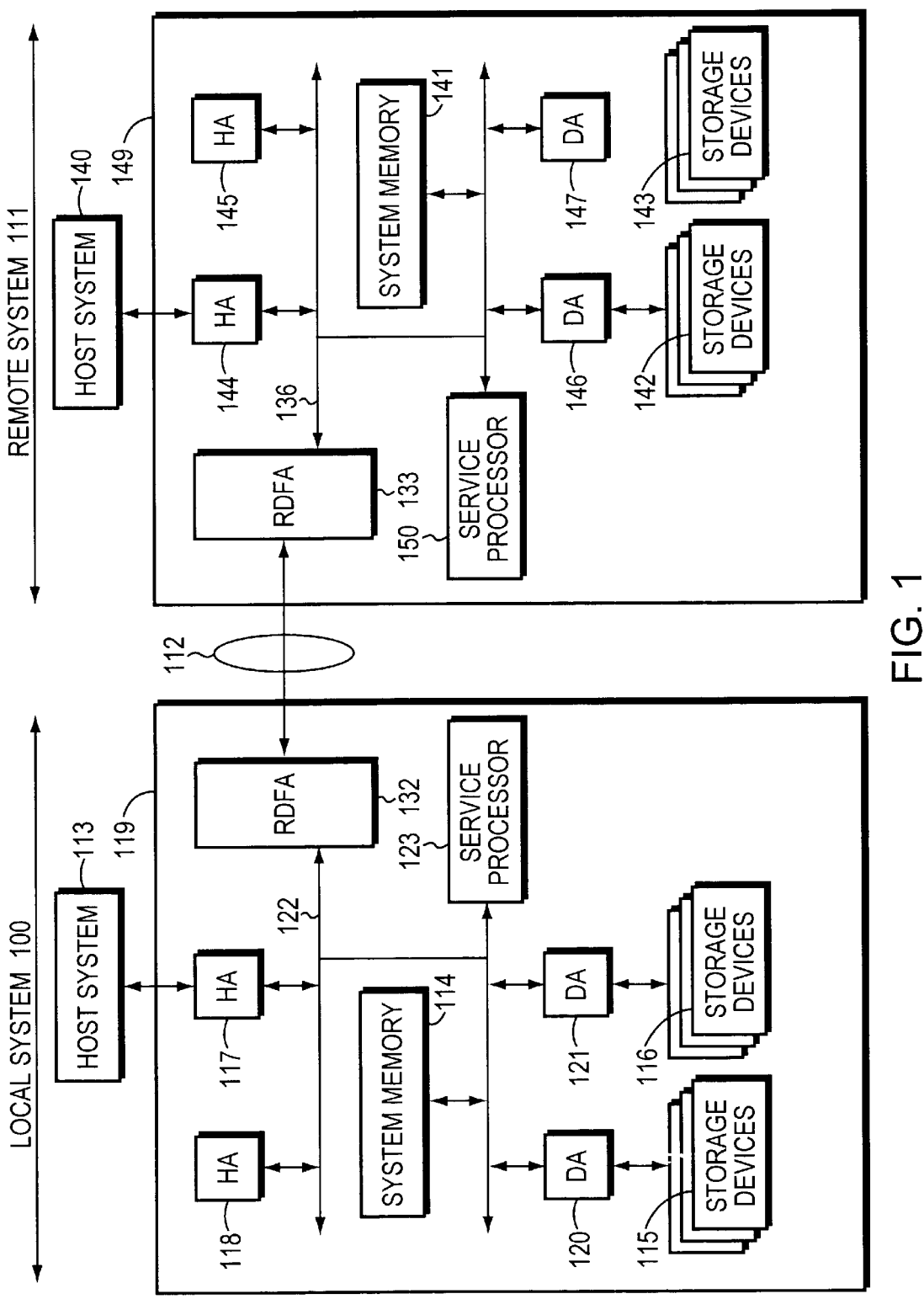
FIG. 1 is a block diagram of a computer system including logic for operating the present invention and showing communicating local and remote data storage environments.

Referring now to FIG. 1, reference is now made to a computer system environment in which the invention is particularly useful and includes a local system 100 (also referred to as "source" or "primary" system) and remote system 111 (also referred to as "target" or "secondary" system). Each of these includes respective data storage systems 119 and 149 that in a preferred embodiment are each Symmetrix Integrated Cache Disk Arrays available from EMC Corporation of Hopkinton, Mass. Such data storage systems and their implementations are fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

For purposes of this invention it is sufficient to understand that the remote system 111 normally acts as a mirror of the local system 100 on a volume-by-volume basis and that the volumes can by physical volumes, although logical volumes are preferred.

Figure 2:
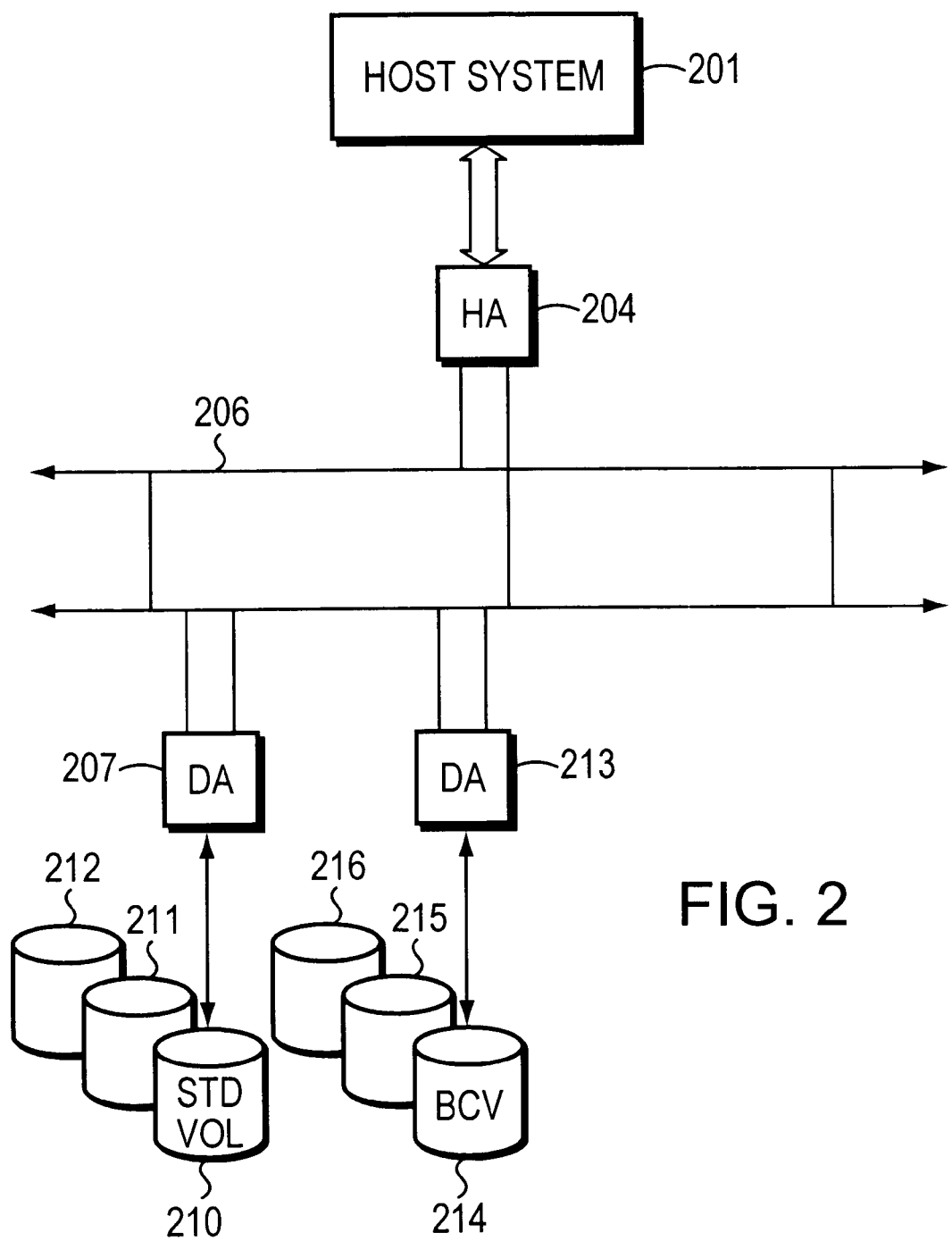
FIG. 2 is an alternative embodiment of the local data storage environment and the computer system of FIG. 1 and which shows at least one logical standard and a device storing a copy of all the data from the standard device and which is denoted as a business continuance volume (BCV) in a preferred embodiment for which the present invention is useful.

Although the invention is particularly useful in an environment employing a local and remote data storage system, it will become apparent upon reading this specification, the invention is also useful in a local system itself wherein replicating to a local volume denoted as a business continuance volume (BCV) is employed (FIG. 2). Such a local system which employs mirroring for allowing access to production volumes while performing backup is also described in the '497 patent incorporated herein.

Returning again to FIG. 1, a communications link 112, comprising high-speed data transmission lines interconnects the local system 100 and remote system 111. The physical separation between the local system 100 and the remote system 111 may be up to hundreds of kilometers or more.

The local system 100 comprises major components including a host system 113 formed of a host processor and the data storage facility 119 that includes a system memory 114 and sets or pluralities 115 and 116 of multiple data storage devices or data stores. The system memory 114 can comprise a buffer or cache memory; the storage devices in the pluralities 115 and 116 can comprise disk storage devices, optical storage devices and the like. The sets 115 and 116 represent an array of storage devices in any of a variety of known configurations. However, in a preferred embodiment the storage devices are disk storage devices.

A host adapter (HA) 117 provides communications between the host system 113 and the system memory 114; disk adapters (DA) 120 and 121 provide pathways between the system memory 114 and the storage device pluralities 115 and 116. A bus 122 interconnects the system memory 114, the host adapters 117 and 118 and the disk adapters 120 and 121. Remote Data Facility Adapter (RDFA) 132 provides access to another RDFA 133 along communicative path 122 and through path 112, respectively. RDFA 133, in turn, provides local system 100 with access to the storage devices 142–143 on remote system 111.

Each system memory 114 and 141 is used by various elements within the respective systems to transfer information and interact between the respective host adapters and disk adapters. Additionally, service processors 123 and 150 on each respective system 100 and 111 each monitor and control certain operations and provides a primary interface for an external operator to respective systems and may be used for implementing utilities such as a utility for carrying out operations of the present invention.

Logic for carrying out the methods of this invention are preferably included as part of the data storage system 119 or 149, and may be implemented in whole or part with the host and/or disk adapters, or as part of the service processor, or may in whole or part be included in computer readable form on either host system. Nevertheless, one skilled in the computer arts will recognize that the logic, which may be implemented interchangeably as hardware or software may be implemented in various fashions in accordance with the teachings presented now.

Generally speaking, the local system 100 operates in response to commands from one or more host systems, such as the host system 113, that a connected host adapter, such as host adapter 117 receives. In a preferred embodiment for implementation of this invention, host system 113 is an IBM AS/400 available from IBM Corporation of Armonk, N.Y. and the host adapter may operate according to a Small Computer Systems Interface (SCSI) protocol to connect storage devices, e.g. devices 115–116, to the host.

The host adapters 117 and 118 transfer commands to a command buffer that is part of system memory 114. The command buffer stores data structures and write requests that the disk adapters generate. The disk adapters, such as the disk adapters 120 or 121, respond by effecting a corresponding operation using the information in a command buffer. The selected disk adapter then initiates a data operation. Reading operations transfer data from the storage devices to the system memory 114 through a corresponding disk adapter and subsequently transfer data from the system memory 114 to the corresponding host adapter, such as host adapter 117 when the host system 113 initiates the data writing operation.

As briefly described above, RDFA 132 (FIG. 1) controls transfers of data between the local system 100 and the remote system 111 over the communications link 112. In turn, the remote system 111 includes a RDFA 133 including appropriate buffers and memory and which connects to the communications link 112. Signals received from RDFA 133 transfer over a system bus 136, like the system bus 122, of the remote system 111. The remote system 111, like the local system 100, includes, as its major components, a host system 140, a system memory 141 and storage device sets or data stores 142 and 143. The sets 142 and 143 represent an array of storage devices configured to mirror the sets 115 and 116. In the same fashion as in the local system 100, the remote system 111 includes host adapters 144 and 145 for connection to host systems. In this particular embodiment, the host system 140 (preferably an IBM AS/400) connects to the bus 136 through the host adapter 144 (preferably in accordance with a SCSI protocol). Disk adapters 146 and 147 provide pathways between the system bus 136 and the storage device sets 142 and 143, respectively.

FIG. 2 represents an alternative embodiment of a local system 100 shown in FIG. 1 that includes at least one host system 201 (also preferably an IBM AS/400) which communicates through a corresponding host adapter 204 (preferably also obeying a SCSI protocol). Host system 201 is like Host system 113 (FIG. 1) and so are other like components, but each is described separately from FIG. 1, which also includes a remote configuration, in order to clearly describe certain important concepts that are more easily described in a single local data storage environment. Such concepts include logical volumes and the effects of host commands on such volumes that may create problems for which the present invention provides solutions.

A bus system 206 interconnects the host adapter 204 with disk adapters 207 and 213 that are like the disk adapters 120 and 121 in FIG. 1. In this particular embodiment, the disk adapter 207 controls the operations of a series of physical disks that are shown in terms of three logical volumes 210, 211, and 212. The segmentation or hypering of physical disks into logical volumes is well known in the art.

Similarly a disk adapter 213 interfaces another series of logical volumes 214, 215 and 216 to the bus 206. Each of these volumes 214 through 216 is defined as a Business Continuation Volume and is designated a BCV device. The concept of BCV's are described in detail in the incorporated '497 patent so will be only generally descried herein. Each BCV device comprises a standard disk controller and related disk storage devices as shown in FIG. 1 especially configured to independently support applications and processes. The use of these BCV devices enables a host such as host 201 to utilize instantaneous copies of the data in the standard volumes 210 through 211. There typically will be at least one BCV volume assigned to each host device that will operate on a data set concurrently.

Referring again to FIG. 2, host 201 may continue online transaction processing or like processing without any impact or load on the volumes 210 through 212, while their respective mirror images on BCV's 214–216 are used to back up data. All of this is essentially transparent to the user, but as will become apparent a problem that is created in such an environment is resolved by this invention.

The operation of a BCV device and its corresponding BCV volume or volumes is more readily understood in terms of data sets stored in logical volumes and is useful for understanding the present invention. As known, any given logical volume may be stored on a portion or all of one physical disk drive or on two or more disk drives.

Examples of configurations in which the invention is useful are described below with reference to FIGS. 3–9. Some known configurations and commands are described with reference to this figures for purposes of explaining problems that would exist in such data storage system environments without the present invention.

Figure 3:
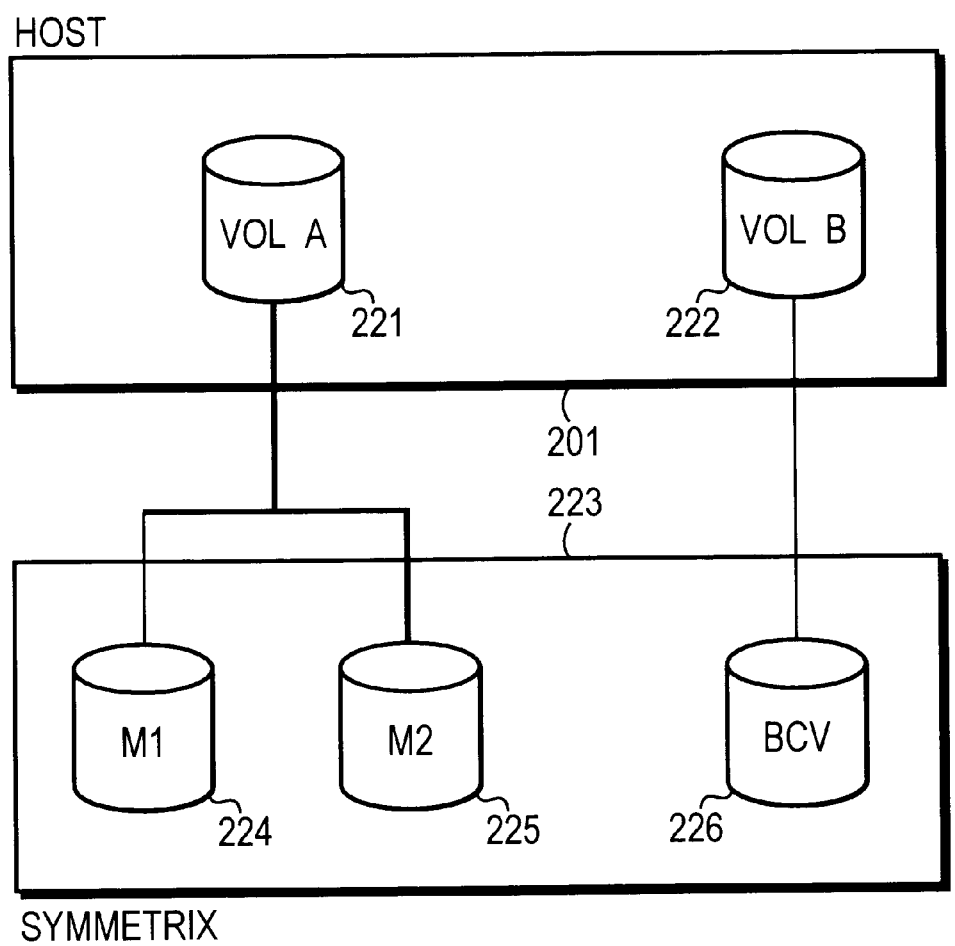
FIG. 3 is a representation of a configuration of the computer system of FIG. 2 in which the invention may be configured and operate with standard and BCV devices.

FIG. 3 depicts host 201 (FIG. 2) containing two types of applications. In the context of a set of application programs, a Volume A application 221 could represent an application that operates on a data set in a logical Volume A and a Volume B application 222 could represent a backup application. Also in FIG. 3, a storage unit 223 (preferably an EMC Symmetrix) is represented as comprising two disk volumes that are mirrors, denoted as M1 and M2 respectively. They are an M1 volume 224 and an M2 volume 225.

Following this example configuration, a third storage volume 226 comprises a BCV device 226. In this particular example, the M1 and M2 devices 224 and 225 can actually comprise multiple physical disks as might be incorporated in a RAID-5 redundancy. In such an event the BCV volume would also comprise multiple disks so that the BCV device could act as a mirror. Generally each mirror volume and the BCV device will be on physical disk drives that connect to separate disk adapters, as known in the art.

Figure 4:
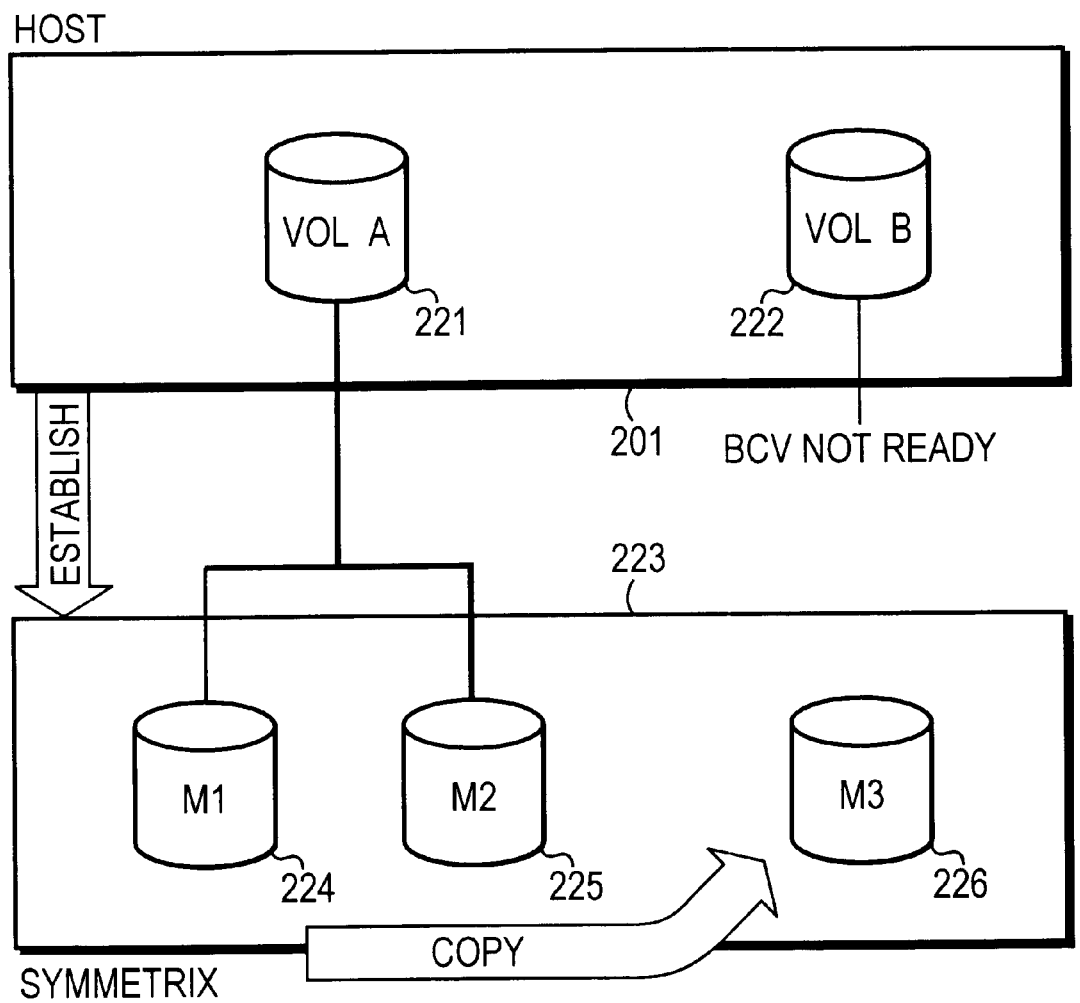
FIG. 4 is a representation of the configuration shown in FIG. 3 and demonstrating the effect of the ESTABLISH command on such a configuration.
Figure 5:
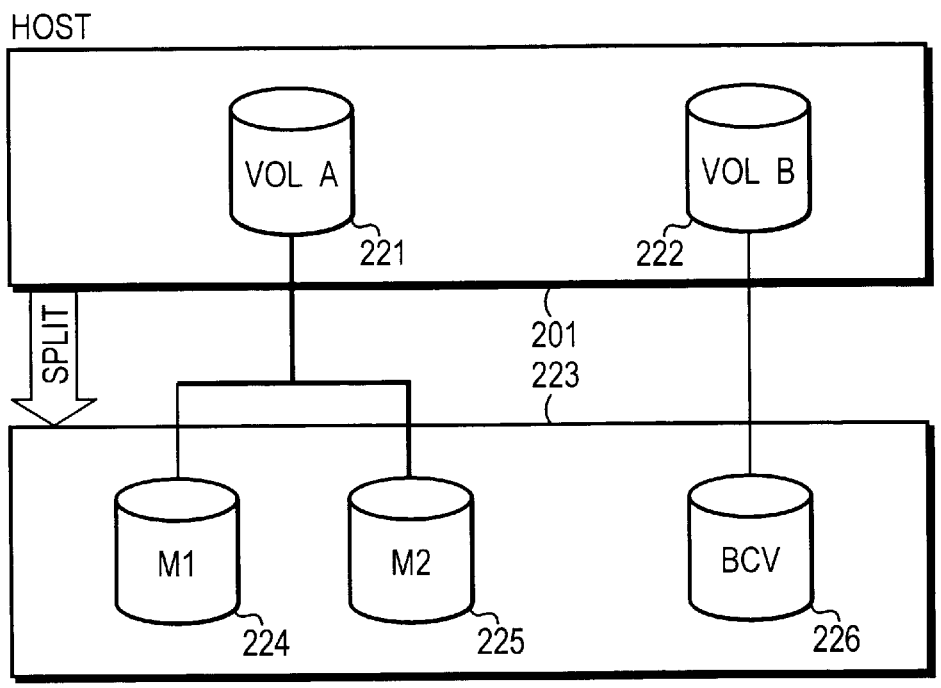
FIG. 5 is a representation of the configuration shown in each of FIGS. 3 and 4 demonstrating the effect of the SPLIT command on such a configuration.
Figure 6:
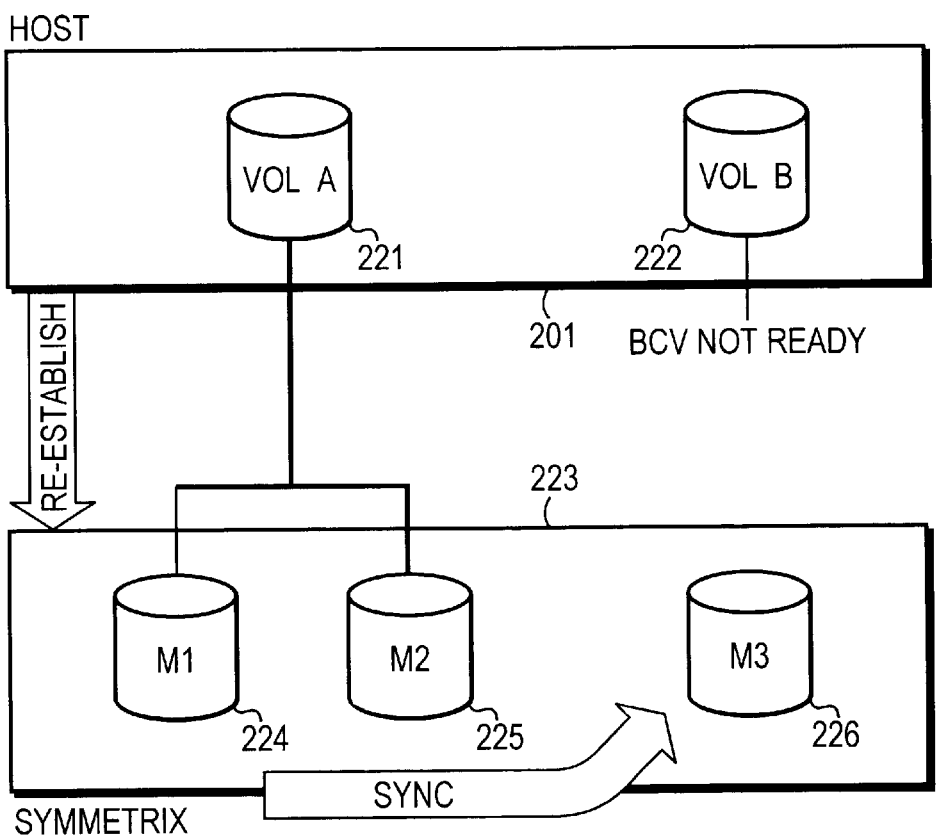
FIG. 6 is a representation of the configuration shown in each of FIGS. 3–5 and demonstrating the effect of the RE-ESTABLISH command on such a configuration.

Once the shown relationship is established, the host 201 in FIG. 4 can issue a number of commands to ESTABLISH the BCV device 226 as another mirror, to SPLIT the BCV device 226 as a mirror and re-establish a data transfer path with the volume 222, (FIG. 5) to RE-ESTABLISH the BCV device as a mirror 226 and to restore data from the BCV device 226 when it operates as a mirror synchronized to the storage devices 224 and 225 (FIG. 6). Each of these operations is described in detail in the incorporated '497 reference, but are briefly explained now for the sake of completeness.

Reference is made now to FIGS. 4, and 5 for explaining the ESTABLISH and SPLIT commands. In the example configuration of FIG. 4, the ESTABLISH command pairs BCV device 226 to standard device 224 M1 as the next available mirror M3. Then all tracks (full volume) are copied from the standard device M1 to the BCV device. Referring now to FIG. 5, on issuance of the SPLIT command following the ESTABLISH command, the established standard/BCV pair (224/226) are broken apart and the BCV 224 becomes available to its original host address.

In FIG. 6, a RE-ESTABLISH command is issued by Host 201 to resynchronize the previously SPLIT standard/BCV pair by performing effectively an incremental ESTABLISH. Under operation of this command only updated tracks from the standard to the BCV device are copied and any BCV tracks that were changed are refreshed. The BCV device is not available to its original host address until SPLIT again. In a normal environment, once the volumes are ESTABLISHED, normal operation consists of a series of sequential RE-ESTABLISH and SPLIT commands according to some pre-determined schedule, which is often dictated by backup needs.

Figure 7:
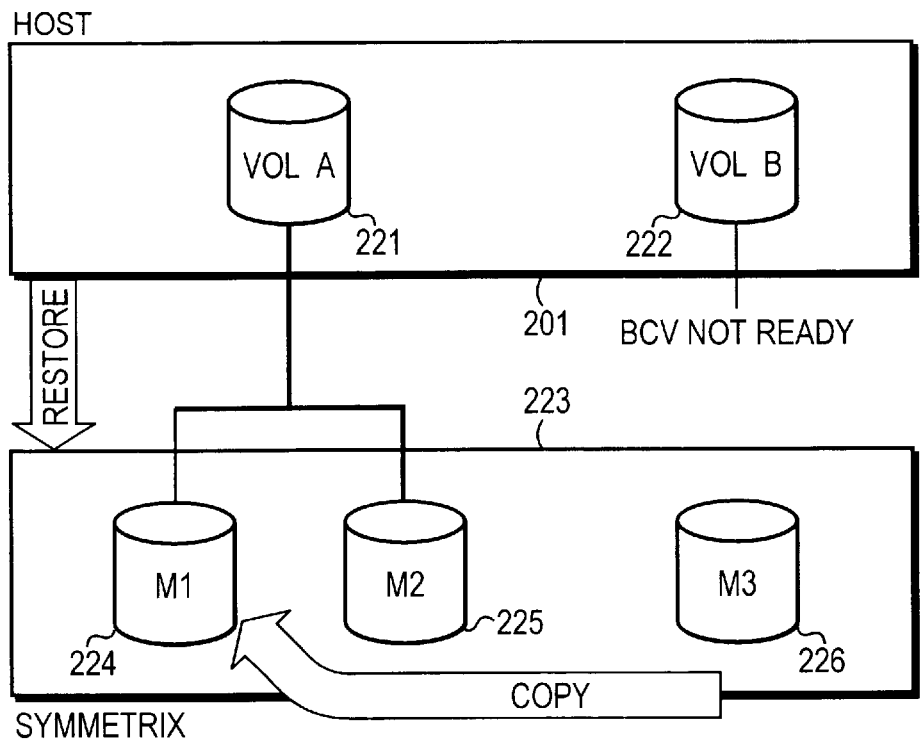
FIG. 7 is a representation of the configuration shown in FIG. 3 and demonstrating the effect of the RESTORE command on such a configuration.
Figure 8:
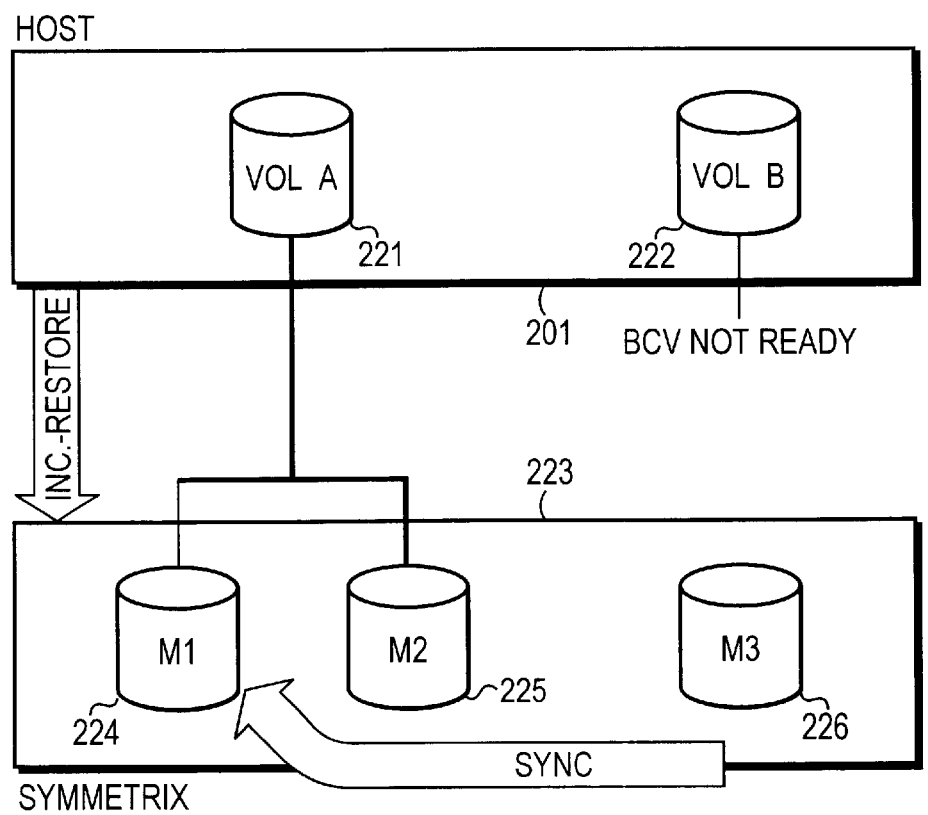
FIG. 8 is a representation of the configuration shown in FIGS. 3 and 7 and demonstrating the effect of the INCREMENTAL RESTORE command on such a configuration.

Referring to FIGS. 7 and 8, Analogous commands to ESTABLISH and RE-ESTABLISH are RESTORE and INCREMENTAL RESTORE. For example, with reference to FIG. 7, on issuance of a RESTORE command, BCV device 224 is paired to standard device 226 as the next available mirror. Then all volumes are copied (full volume) from the BCV 224 to the standard device 226. Thus, copying under the RESTORE command occurs in the reverse direction from the ESTABLISH command. The BCV is made not available to its original Host address. Shown in FIG. 8, the INCREMENTAL RESTORE is the same as the restore except copies are made only of updated tracks from BCV to the Standard device and the devices are resynchronized. A SPLIT command (FIG. 5) may be issued to make the BCV device once again available to the Host 201 after either the RESTORE or INCREMENTAL RESTORE.

Typically, the RESTORE and INCREMENTAL RESTORE commands are used in circumstances requiring recovery of data, perhaps due to an error or fault. Either command allows essentially returning the state of the data from the standard device back to a condition it had been at about when an ESTABLISH or RE-ESTABLISH command was issued.

Figure 9:
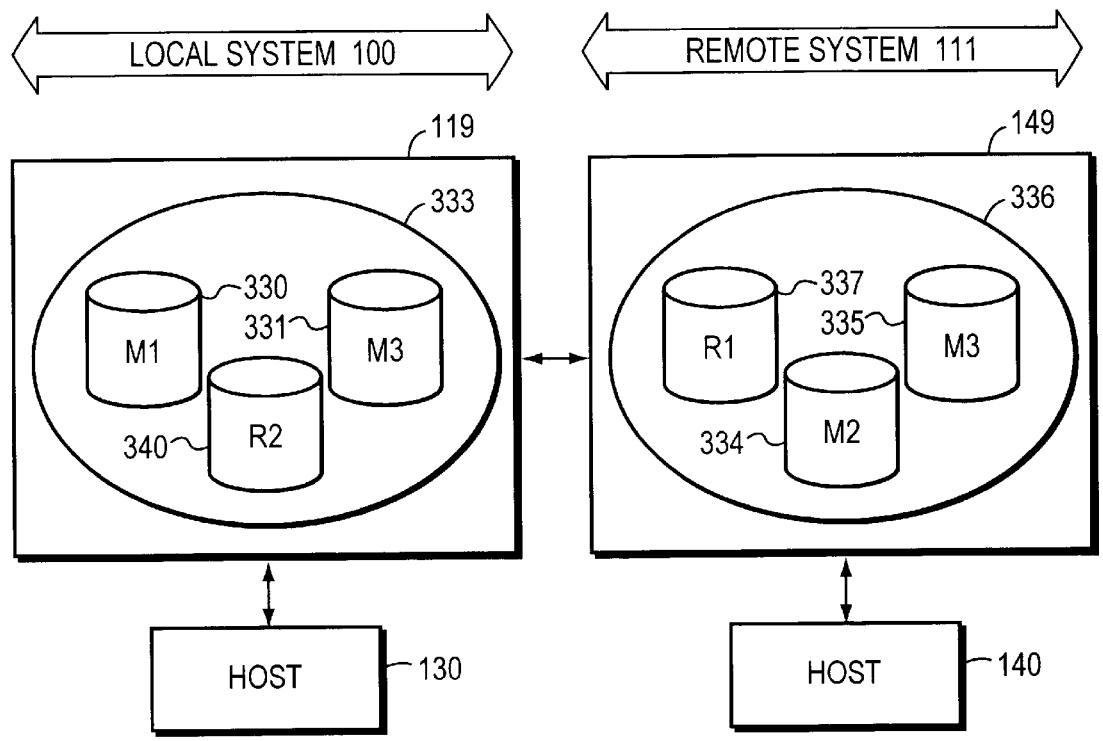
FIG. 9 is a representation of the system shown in FIG. 1 and demonstrating the effect of at least some of the various commands shown in FIGS. 4–8 within the depicted local and remote data storage environments.

FIG. 9 illustrates an analogous situation wherein devices on the remote system 111 (See FIG. 1) are used for copying devices on the local system 100. If an error or fault condition occurs on data storage system 119 it may become necessary to recover data from all such storage devices using data mirrored over to storage devices 142–143 on remote data storage system 149. Employing the preferred EMC Symmetrix data storage system such a recovery operation is known as a "failover" using a Symmetrix Data Remote Facility (SRDF) system. Generally, a failover involves restoring data damaged, corrupted, or lost on a local (primary or source) data storage system with data that has been mirrored to a remote (secondary or target) data storage system. The SRDF is a facility for maintaining real-time or near-real-time physically separate copies of selected volumes, and is available from EMC of Hopkinton, Mass.

A detailed description of failover-related techniques and SRDF-type configurations employing remote mirrors is included in the incorporated '497 patent. The present invention provides a solution to a problem that may occur in a SRDF environment employing a failover technique so such a environment should be generally understood for purposes of understanding this invention.

For the sake of completeness, a brief overview of such a configuration is now given. Host system 130 and a host system 140 interact with each respective data storage system as described with reference to FIG. 1. The local system 100 includes two mirror memory devices identified as M1 and M3 mirror device 330 and 331. As previously indicated, these mirrors might be connected to the disk adapters 120 and 121 in FIG. 1, respectively. The M1 and M3 mirror devices represent a source device R1 designated by reference numeral 333.

At the remote system, a data storage facility includes M2 and M3 mirror devices 334 and 335, respectively, that could attach to disk adapters such as disk adapters 146 and 147 in FIG. 1. These memory devices constitute a target or R2 memory device represented by reference numeral 336 that acts as a remote mirror. As will be apparent, in this configuration there are local and remote mirrors. Each mirror has an assigned specific number, e.g., 1, 2, 3 . . . Local and remote mirrors are designated by the use of "M" and "R" respectively.

A remote logical device RI represented by reference numeral 337 in the target R2 device 336 is a remote mirror representing the entire source R1 device represented by reference numeral 333. Similarly an R2 mirror device 340 is a remote logical device that is a mirror representing the entire target R2 device 336. Thus, if a change is made to the source R1 device 333, the change is made to both the M1 and M3 mirror devices 330 and 331 and the change is transferred to the remote system 111 to be made on the M2 and M3 mirror memory devices 334 and 335.

Generally, the inventors have critically recognized that each of the above-described situations has the potential of propagating an error condition. Generally, the problem solved by this invention relates to the device identification information being replicated to another device which has its own such information and which will not be the same. Such non-matching information may be flagged by a host as being an error. Without this invention, such problems are likely to occur using at least the ESTABLISH or RESTORE command (FIGS. 4 and 7), or any command which copies all tracks full volume from a standard to a BCV device or vice-versa. Also, absent the present invention, such problems would otherwise occur if copying were done remotely as described with reference to FIG. 9 or during an SRDF-type of failover.

Example of Problem Solved by this Invention in the Preferred IBM AS/400 Environment:

In the preferred environment for implementing the present invention, the host is an IBM AS/400 and the data storage system is an EMC Symmetrix Integrated Cache Disk Array. In such an environment, it is known that the AS/400 may query the Symmetrix for the data storage device identification information, such as device serial numbers for devices 115–116 (FIG. 1).

In such an environment, the device serial number is mapped by the HA:

TABLE 1

HA Mapping for Device Serial Number

| Digit Number(s) | Meaning |
|---|---|
| 0–1 | LUN + 1 |
| 2–4 | Last 3 digits of disk array serial number |
| 5–6 | Host adapter (HA) number |
| 7 | HA port number |

As shown in Table 1, each data storage device, such as devices 115–116 (FIG. 1), in accordance with the preferred SCSI protocol is assigned a unique address that includes a unique logical unit number (LUN) assigned by the HA, such as HA's 117–118. The HA further creates the serial number from the rest of the required information, including the carrying over of the disk array serial's number. Thus, the serial number in the preferred environment of a Symmetrix connected to an IBM AS/400 host is derived as a function of the Host adapter (HA) mapping of the drive. Nevertheless, the invention is useful in a system wherein the serial number is derived directly from the device itself (for example, by electronic means) because how the serial number itself is originally recognized for the device having its data copied is not a critical aspect of this invention.

The AS/400, on its first initial program load (IPL) of a non-configured drive, receives the serial number, adds the device to the system, and writes the serial number to a designated area on the source or primary standard device. Without this invention, when the next IPLs are performed with the already configured drives, the AS/400 gets the serial number from the HA. This means that when the HA mapping changes, the serial number changes with it and then the AS/400 doesn't recognize it. The inventors of this invention have further critically recognized that some AS/400 version incorporate a verification of the disk serial number. Upon IPL, the operating system compares the reported serial number with the serial number written on disk.

If there is a mismatch, the operating system fails the IPL requirements and does not allow the IPL to continue. Unfortunately, and without the present invention, such a mismatch is very likely to happen if there is an attempt to RESTORE data by using the copied data from a remote system (e.g., remote systems 111). This is because the remote system has a different Symmetrix serial number and the storage devices or drives have the serial number written by the source host 140 (FIG. 1).

After failing over to the target side and booting the target drives, the information written on the disks previously by the host reflects the disk array and the device on which the data was originally written, but the inquiry reports a different serial number, i.e. the serial number of the device onto which the data has been replicated. Conflicts may also exist because there are likely different LUN and HA port numbers involved each of which is used by the HA for mapping.

In such a situation, the storage devices have the configuration of the primary or local system 119 (FIG. 1) with serial numbers written on the target devices from the primary side. A host inquiry command to discover the target device's serial number reflects a different serial number thus causing an error that may cause the IPL to fail.

Solution Provided by this Invention

Figure 10:
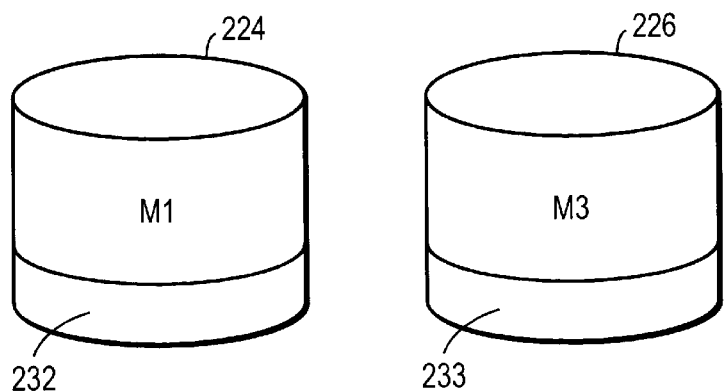
FIG. 10 is a representation of a configuration useful with the logic of this invention for carrying out the method steps of FIGS. 12–14 and demonstrating the assignment of a predetermined area for storing a data structure shown in FIG. 11.

To solve this problem, the systems of FIGS. 1 and 2, are configured and programmed to implement a novel method which employs a data structure shown in FIG. 11, and a configuration shown schematically in FIG. 10, each of which will be discussed in significant detail below and following a brief overview.

Overview of Method

A data structure (described below with reference to FIG. 9) is created including the data storage device identification information, e.g., serial number of a primary (source) or standard device. Such a serial number may have been conveniently created using a standard HA mapping technique described above with reference to Table 1, or may be created by other techniques, including electronically receiving it from the device itself. Although the serial number is a convenient form of data storage device identification information, one skilled in the art will recognize that this invention is not limited to just that specific type of information.

The data structure is placed in a predetermined area, e.g. as the CE cylinder, on the primary or standard device. The CE cylinder is a physical area on a data storage disk on the preferred Symmetrix that is typically the last physical cylinder and that is reserved for a customer engineer (i.e. service or maintenance persons). It is not available for storing production data, so it is a good choice for an area to store a data structure containing device identification information. Nevertheless, one skilled in the art will appreciate that the invention is not limited to such a choice.

The data structure is copied to the same CE cylinder area on a remote (secondary or target), BCV, or other device. When the preferred AS/400 issues an inquiry to discover the serial number of the other device, the referred Symmetrix does not build the serial number from the HA but reads it from the data structure stored on the CE cylinder on that device. In this way the serial number belongs to the primary, source, or standard device and moves with the data to prevent the host flagging conflicting serial number-related information as an error.

The inventor's envision that Service processor 123 may be used to run various utilities such as a utility that enables manual manipulation of the serial number values written to the CE cylinder. The service processor may be used to write the serial number from the local or source device and propagate it to a remote or target device. The service processor may correlate the standard serial number with the one created by HA mapping in order to create a lookup table (not shown) for correlation purposes.

Method Steps of the Invention

Now for a better understanding of the method steps of this invention the steps are described in detail with reference to FIGS. 12–14, using a preferred configuration shown in FIG. 10 and the data structure shown in FIG. 11. In step 400, the primary or standard device's identification information, such as serial number, is mapped by the HA in a conventional manner as shown by following the rules shown in Table 1 above. In step 402, the system creates data structure 300 (FIG. 11) which includes a field for the serial number (preferably 7 bits) that was created in step 400 and a field for a validity flag (preferably a bit). The serial number field now contains the HA mapped serial number for the primary device. Next in step 404, a predetermined area, such as CE cylinder 232 (FIG. 10) on the primary or standard device 224 is assigned for storing the data structure and it is stored there.

Figure 11:
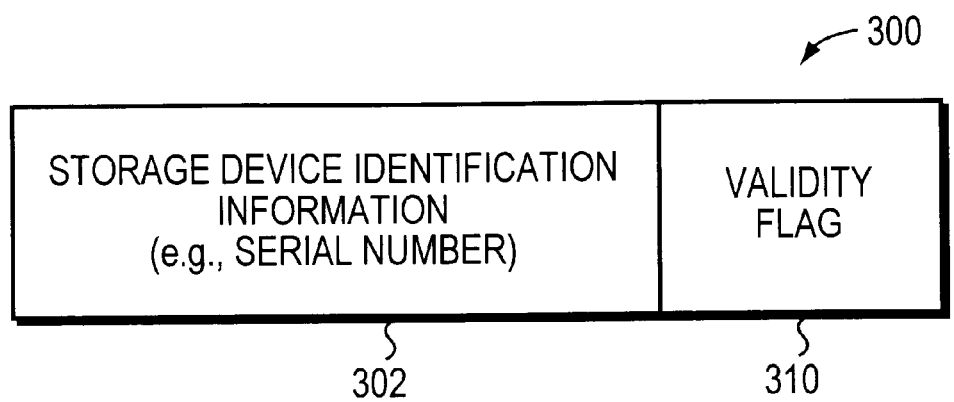
FIG. 11 is a schematic of a data structure that is used with the logic of this invention to carry out the method steps of FIGS. 12–14.
Figure 12:
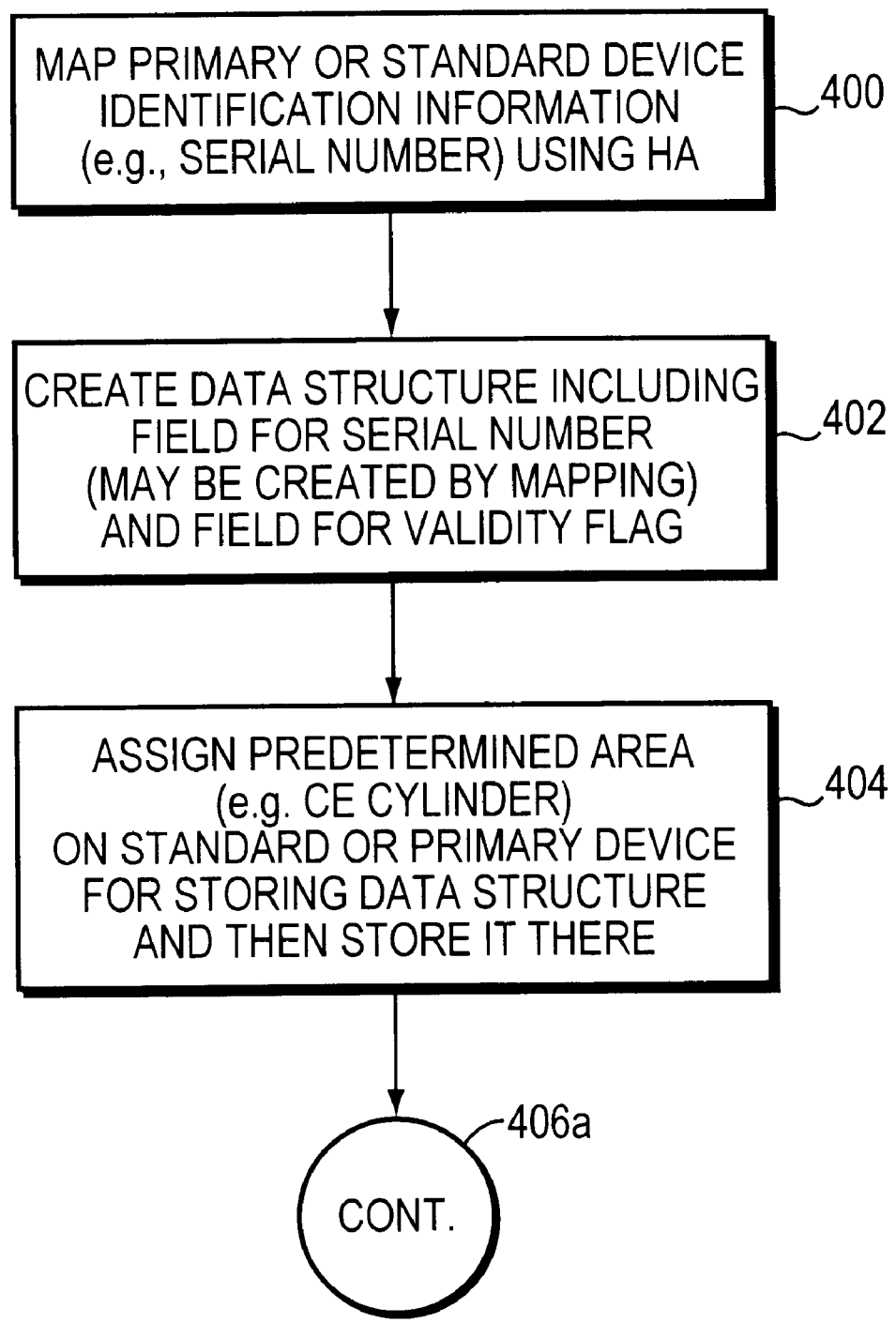
FIG. 12 is a flow logic diagram illustrating some method steps of the method of this invention carried out by the logic of this invention.
Figure 13:
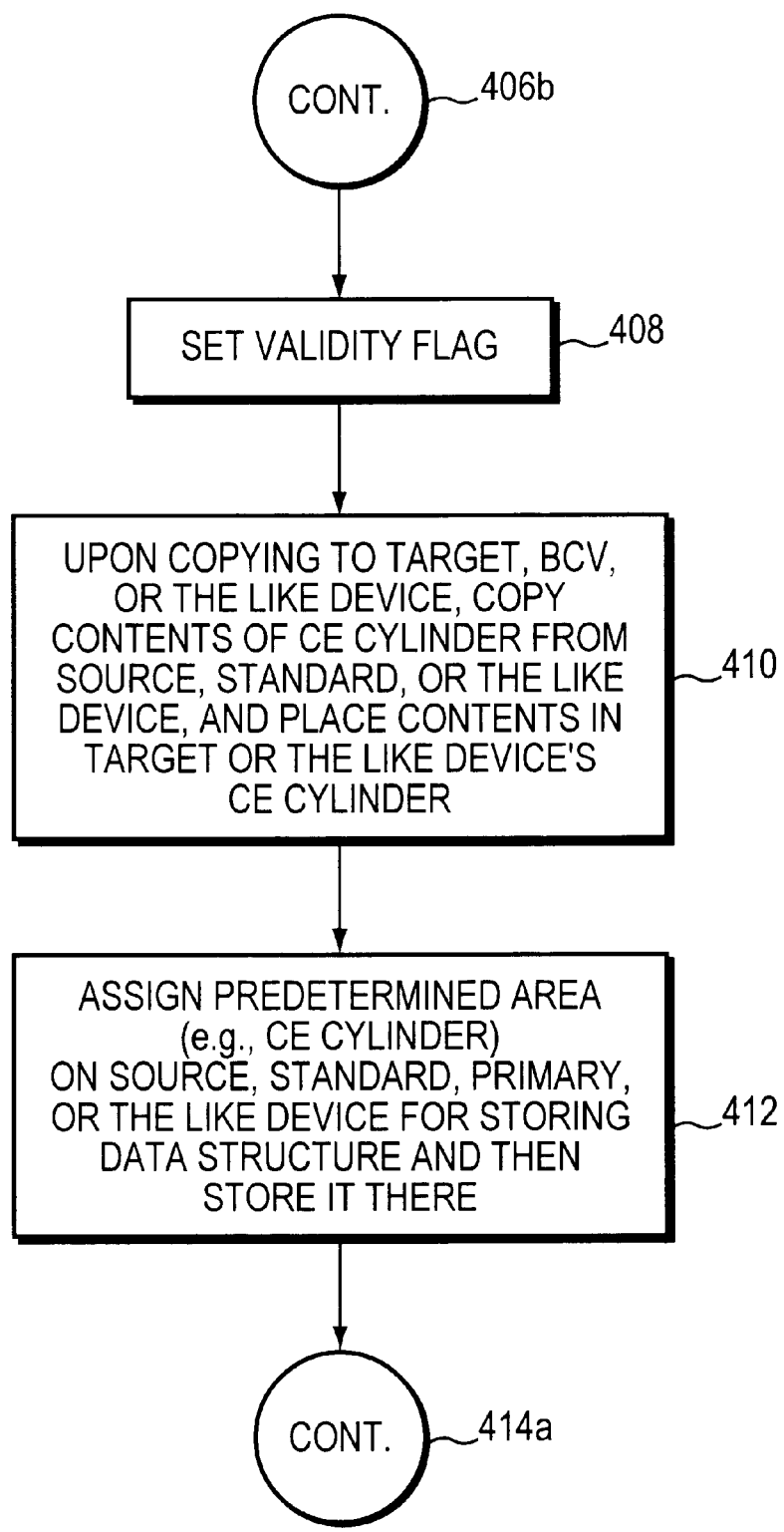
FIG. 13 is another flow logic diagram illustrating more method steps of the method of this invention carried out by the logic of this invention.
Figure 14:
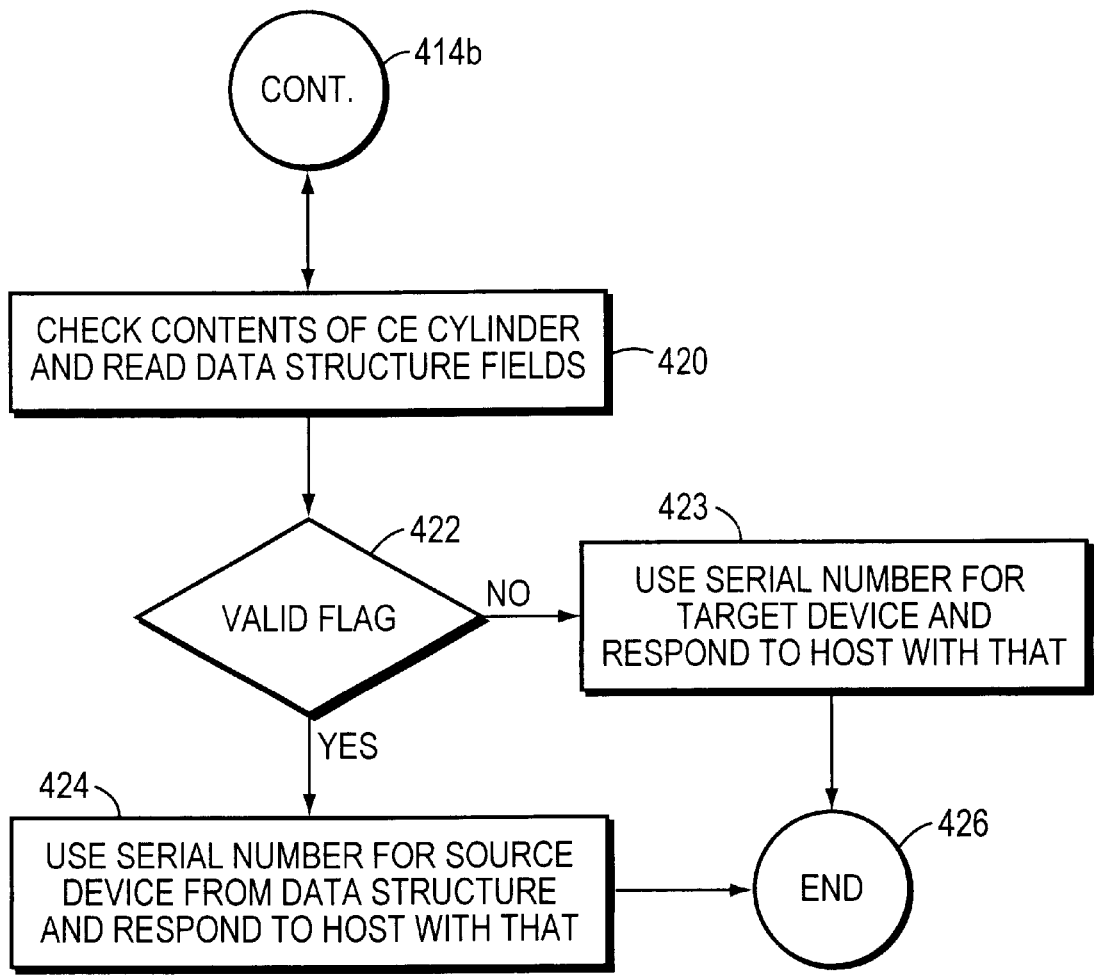
FIG. 14 is still another logic diagram illustrating more method steps of the method of this invention carried out by the logic of this invention.

Referring now to FIGS. 13 and 11, (continuation step 406a-b flows into method step 408 on FIG. 13), once the data structure is stored in the CE cylinder 232 of M1 device 224 (FIG. 11) then the validity flag is set as being valid, in step 408. The M1 device 224 in keeping with the convention herein established is the primary, source, or standard device that has data that is to be fully replicated onto a so-called M3 secondary or target device 226. Device 226 as the receiver of the data may be a BCV device and includes its own CE cylinder 233.

Referring again to FIG. 13, in step 410, the contents of the CE cylinder 232, including the data structure having the primary, source, or standard device's serial number, are copied to the CE cylinder 233 of M3 device 226. In response to a host or SCSI inquiry requesting the device serial number for the secondary device, the system checks the contents of the CE cylinder, in step 412. Step 414*a* continues to Step 414*b* (FIG. 14).

In step 420, the contents of the CE cylinder on the secondary or target device are checked and Data Structure 300 (FIG. 11) is read to determine the contents of its fields including serial number field 302 and validity flag field 310. Next, in step 422, the system determines if the validity flag is set as valid. If it is not, then in step 423, the system uses the serial number for the secondary or target device and responds to the host with that number. The serial number for that device may be obtained in a conventional manner such as was done for the primary device in step 400. The process then "Ends" in step 426. But, if the flag is valid the process does not yet end because step 424 must be executed first. Instead the host query is satisfied by answering the query with the serial number of the primary or standard device which is read from the data structure in step 424. Once that step is complete then processing ends in step 426 as described above with reference to a different path along the logic flow diagram.

A system and method has been described for resolving potential errors when a host queries for identification information from a device that is being used for receiving replicated data from another device. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a computer system having a plurality of storage devices and a host computer which interacts with the storage devices, a method for managing identification of the storage devices for the host computer when data is replicated from a storage device of the plurality of storage devices to another storage device of the plurality of storage devices, the method comprising the steps of:

storing storage device identification information for a first storage device of the plurality of storage devices on a first predetermined area of the first storage device;

storing the storage device identification information in a second predetermined location on a second storage device of the plurality of storage devices and that is used to copy the data from the first storage device; and in response to an inquiry from the host computer regarding the device identification information for the second storage device, selectively responding with either (i) the device identification information for the first storage device or (ii) with storage identification information for the second storage device, wherein such selectivity is based on a predetermined criterion.

2. The method of claim 1, wherein the storage device identification information for a first storage device of the plurality of storage devices is stored in a field of a data structure that is stored on a first predetermined area of the first storage device.

3. The method of claim 2, wherein the computer system includes at least one host adapter associated with each storage device, and including the step of a host adapter associated with the first storage device mapping the first storage device identification information according to a predetermined protocol, and further including the step of placing the mapped storage device identification information in the data structure.

4. The method of claim 3, wherein the data structure also includes a field related to a validity flag that indicates a validity state of the data in the data structure.

5. The method of claim 4, wherein the at least one predetermined criterion includes a determination of whether or not the second predetermined location contains the data structure, and if it does not, then selectively responding with storage identification information for the second storage device that is created by a host adapter associated with the second storage device that maps that identification information in accordance with a predetermined protocol.

6. The method of claim 5, wherein if the second predetermined location does contain the data structure then determining if the data in the data structure is valid, and if it is, then selectively responding with the first storage device identification information included in the data structure stored on the second storage device, otherwise, selectively responding with storage identification information for the second storage device that is created by a host adapter associated with the second storage device which maps that identification information in accordance with a predetermined protocol.

7. The method of claim 6, wherein the first predetermined location is a CE cylinder on the first storage device and the second predetermined location is a CE cylinder on the second storage device.

8. The method of claim 1, wherein the plurality of storage device are distributed such that the second storage device is remotely located from the first storage device.

9. The method of claim 1, wherein the host computer is an AS/400.

10. The method of claim 9, wherein the first and second storage device identification information is each based on a device serial number.

11. The method of claim 1, wherein the first and second storage device are each a disk drive.

12. The method of claim 11, wherein the data replication occurs as part of an establishment of a logical volume for continuance of operations denoted as a business continuance volume (BCV).

13. The method of claim 11, wherein the data replication occurs as part of an operation to restore data on a disk drive denoted as a restore.

14. A data storage system that communicates with a host computer and which has computer-executable logic for managing identification of the storage devices for the host computer when data is replicated over more than one physical device, the data storage system comprising:

a plurality of storage devices including at least a first storage device and a second storage device, wherein the second storage device is configured to be able to receive data copied from the first storage device; and computer-executable logic configured for causing the following computer-executed steps to occur:

storing storage device identification information for a first storage device of the plurality of storage devices on a first predetermined area of the first storage device;

storing the storage device identification information in a second predetermined location on a second storage device of the plurality of storage devices and that is used to copy the data from the first storage device; and in response to an inquiry from the host computer regarding the device identification information for the second storage device, selectively responding with either (i) the device identification information for the first storage device or (ii) with storage identification information for the second storage device, wherein such selectivity is based on a predetermined criterion.

15. A program product for use in a data storage system that communicates with a host computer and that is for managing identification of the storage devices for the host computer when data is replicated over more than one physical device of the plurality of storage devices that is part of the data storage system, the program product comprising:

computer-executable logic contained on a computer-readable medium and which is configured for causing the following computer-executed steps to occur:

storing storage device identification information for a first storage device of the plurality of storage devices on a first predetermined area of the first storage device;

storing the storage device identification information in a second predetermined location on a second storage device of the plurality of storage devices that is used to copy the data from the first storage device; and in response to an inquiry from the host computer regarding the device identification information for the second storage device, selectively responding with either (i) the device identification information for the first storage device or (ii) with storage identification information for the second storage device, wherein such selectivity is based on a predetermined criterion.

* * * * *